United States Patent [19]

Chen et al.

[11] Patent Number: 4,774,562
[45] Date of Patent: Sep. 27, 1988

[54] IMAGE TRANSMISSION SYSTEM WITH PREVIEW MODE

[75] Inventors: Cheng-Tie Chen; Majid Rabbani, both of Rochester; Scott J. Daly, W. Henrietta, all of N.Y.

[73] Assignee: Eastman Kodak Company, Rochester, N.Y.

[21] Appl. No.: 57,410

[22] Filed: Jun. 2, 1987

[51] Int. Cl.$^4$ .................................... H04N 7/137
[52] U.S. Cl. ................................ 358/13; 358/133; 358/138
[58] Field of Search ..................... 358/133, 138, 13

[56] References Cited

U.S. PATENT DOCUMENTS

| | | | |
|---|---|---|---|
| 4,222,076 | 9/1980 | Knowlton | 358/133 |
| 4,261,018 | 4/1981 | Knowlton | 358/133 |
| 4,302,775 | 11/1981 | Widergren et al. | 358/136 |
| 4,414,580 | 11/1983 | Johnsen et al. | 358/133 |
| 4,672,444 | 6/1987 | Bergen | 358/133 |

OTHER PUBLICATIONS

"Image Display Techniques Using the Cosine Transform", by K. N. Ngan, IEEE Transactions on Acoustics, Speech, and Signal Processing, vol. ASSP-32, No. 1, Feb. 1984.

*Primary Examiner*—Howard W. Britton
*Attorney, Agent, or Firm*—Thomas H. Close

[57] ABSTRACT

A still image communication system performs a block cosine transformation on an image of bandwidth compression. A transmitter subsamples a full resolution image, to provide a preview image, and transforms and transmits the preview image prior to transforming and transmitting the full resolution image. A receiver and displays the preview image, and replaces the preview image on the display block-by-block as the full resolution is received.

7 Claims, 11 Drawing Sheets

```
         PIXEL
LINE        1    2    3 · · · · · 512

```
         VALUE
LINE              1                      2 · · · · 128

| PIXEL LINE | 1 | 2 | 3 ... 128 |
|---|---|---|---|
| 1 | $R_{1,1}$ | $R_{1,2}$ | $R_{1,3}$ ... |
| 2 | $R_{2,1}$ | $R_{2,2}$ | ... |
| 3 | $R_{3,1}$ | ... | |
| ⋮ | | | |
| 512 | $R_{512,1}$ | ... | |

FIG. 8b

| VALUE LINE | 1 | 2 ... 128 |
|---|---|---|
| 1 | $(R_{1,1}+R_{3,1})/2$ | $(R_{1,2}+R_{3,2})/2$ ... |
| 2 | $(R_{5,1}+R_{7,1})/2$ | ... |
| ⋮ | | |
| 128 | $(R_{509,1}+R_{511,1})/2$ | ... |

FIG. 9

| PIXEL LINE | 1 | 2 ... 128 |
|---|---|---|
| 1 | $R'_{1,1}$ | $R'_{2,1}$ ... |
| 2 | $(R'_{1,1}+R'_{2,1})/2$ | ... |
| 3 | $R'_{2,1}$ | ... |
| ⋮ | | |
| 256 | | |

PREVIEW LUMINANCE

CHROMINANCE OVER
PREVIEW LUMINANCE
= PREVIEW IMAGE

SUBSTITUTE
FULL RESOLUTION LUMINANCE
FOR PREVIEW LUMINANCE
= FULL RESOLUTION IMAGE

IMAGE TRANSMISSION SYSTEM WITH PREVIEW MODE

RELATED APPLICATIONS

U.S. Ser. No. 057,066; filed June 2, 1987
U.S. Ser. No. 057,404; filed June 2, 1987
U.S. Ser. No. 057,413; filed June 2, 1987
U.S. Ser. No. 057,585; filed June 2, 1987
U.S. Ser. No. 057,595; filed June 2, 1987
U.S. Ser. No. 057,596; filed June 2, 1987

TECHNICAL FIELD OF THE INVENTION

The present invention relates to systems for transmitting a pictorial image over a narrow-band transmission channel employing a spatial transform coding for image compression, and more particularly to such a system which includes a means for providing a low resolution preview image during transmission of a full resolution image.

BACKGROUND OF THE INVENTION

It is well known that for transmission of a pictorial digital image over a narrow band communication channel, block transform coding techniques (such as discrete cosine transform DCT) achieve very high bit rate compression ratios. Spatial transform coding schemes are able to achieve such high bit rate compression ratios due to the fact that the spatial transformation concentrates most of the energy of a pictorial image in the transform coefficients representing lower spatial frequencies. When the transform coefficients are arranged in order of increasing spatial frequency, for example by the well known zig-zag scan technique, long runs of zero amplitude coefficients are generated. The values of the transform coefficients are Huffman encoded, and the strings of zero amplitude coefficients are run-length encoded for very efficient image compression. See U.S. Pat. No. 4,302,775 issued Nov. 24, 1981 to Widergren et al for an example of such a compression scheme in a video image compression system.

Using a block transform coding scheme, it is possible to transmit a full resolution television frame over a telephone line in less than one minute. It has also been suggested (see the article "Image display techniques using the cosine transform" by King N. Ngan, IEEE transactions on acoustics and signal processing, Vol. ASSP-32 No. 1, February 1984.) that in a low bit rate image transmission system it would be desirable to provide the viewer at the receiver with a quick (within several seconds) "preview" image during transmission of the full resolution image, so that the viewer can quickly evaluate the usefulness of the image being transmitted, and terminate transmission if the full resolution image is not of interest, thereby effecting savings in time and cost. This capability would be very useful for example to quickly browse through a number of images (e.g. ~100) to find a particular image that is desired. Ngan suggests that such a low resolution preview image can be developed from the first few transform coefficients of an image by transmitting the transform coefficients in an order representing increasing spatial frequencies, and performing an inverse transformation on the first few coefficients that are received to provide a preview image.

In a practical pictorial image transmission system, the scheme suggested by Ngan for providing a preview image has several disadvantages which were not discussed in Ngan's article. In a block transform image compression scheme, the image is divided into blocks (e.g. 16×16) of pixels. Consecutive blocks of the image are transformed and the coded transform coefficients are transmitted. The progressive transmission scheme suggested by Ngan, wherein only the first few coefficients from each block are used to generate a preview image, was found by the present inventors to be impractical in an actual image transmission system, since transmitting only the first few coefficients of each block frustrates the run-length coding of the coefficients. Furthermore, since all the coefficients are needed to recover the full resolution image at the receiver, the lower frequency transform coefficients from all the blocks must be stored until the higher frequency coefficients are received, thereby increasing the memory requirements at the receiver.

It is the object of the present invention to provide a system for transmitting pictorial still images over a narrow band transmission channel such as a telephone line, including means for presenting a low resolution preview image that is free of the disadvantages noted above. It is a further object to provide such a system for transmitting a color pictorial image.

SUMMARY OF THE INVENTION

The objects of the present invention are achieved by providing a pictorial still image communication system of the type having means at the transmitter for performing a block cosine transform on an image and for Huffman and run-length coding the transform coefficients to compress the band width of the image, and means at a receiver for displaying a low resolution preview image during transmission of a full resolution image, with means at the receiver for signaling the transmitter to terminate transmission of the image. The transmitter includes means for subsampling a full resolution image to produce a low resolution preview image, and for compressing and transmitting the low resolution image followed by the full resolution image. The receiver includes means for displaying the low resolution image and for replacing a low resolution image block-by-block with the full resolution image as the full resolution image is received.

In a preferred mode of practicing the invention, the system transmits color images having a full resolution luminance component and a chrominance component. The luminance component is subsampled at the transmitter to produce a low resolution preview luminance component. The preview luminance component, the chrominance component, and the full resolution luminance component are transmitted in sequence. At the receiver, the low resolution luminance component is displayed. The chrominance component is added block-by-block to the low resolution luminance display as the chrominance component is received, and the low resolution luminance component is replaced block-by-block with the full resolution luminance component as the full resolution luminance component is received.

BRIEF DISCRIPTION OF THE DRAWINGS

FIG. 5 is a diagram representing one field of the full resolution luminance component of the image;

FIG. 6 is a diagram useful in describing the subsampling of the full resolution luminance component to produce the preview luminance component;

Figure 4:
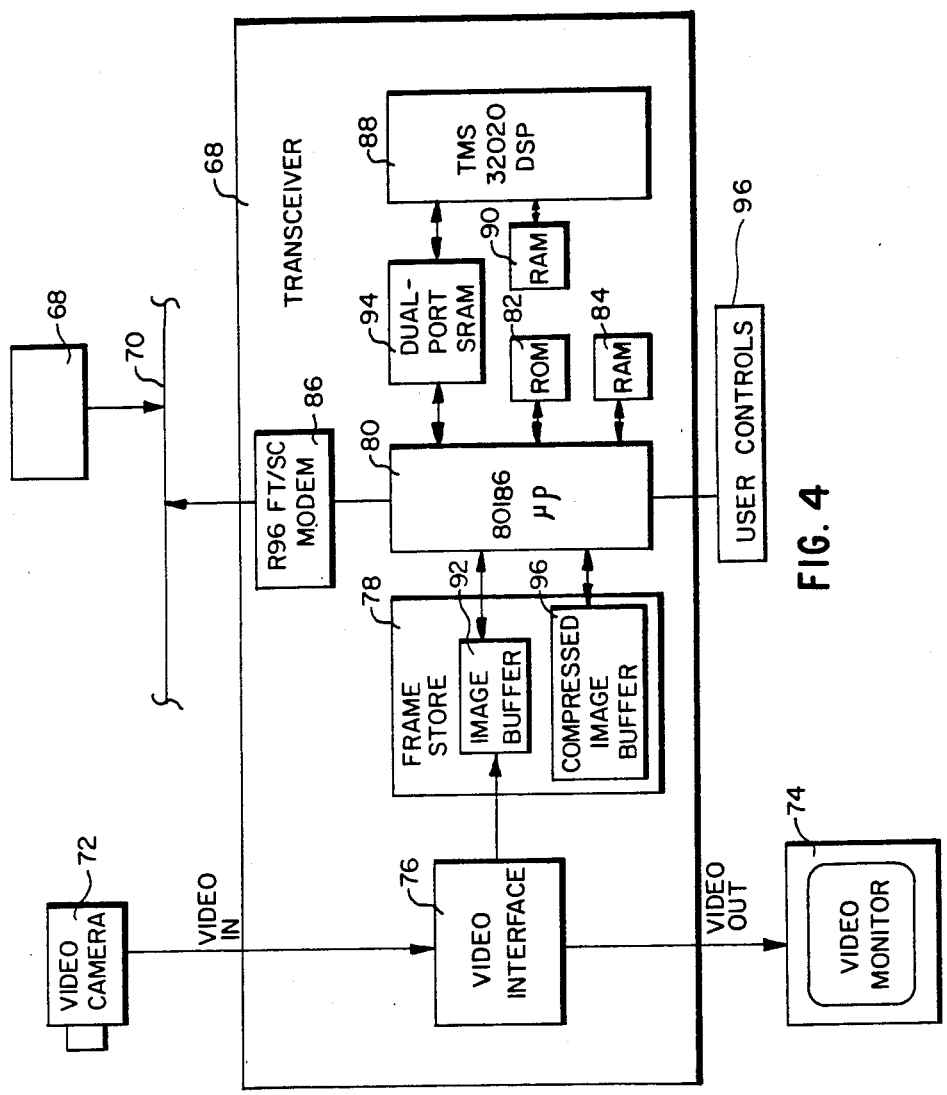
FIG. 4 is a schematic diagram showing a preferred mode of implementing the invention in a communication system having transceivers.
Figure 10A:
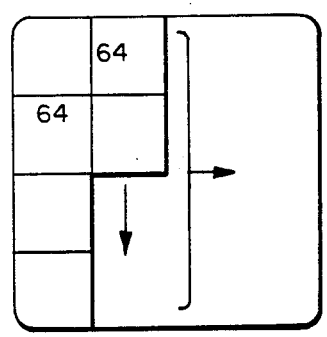

FIGS. 8a and b are diagrams useful in describing the subsampling of the chrominance component of the image;

FIG. 9 is a diagram useful in describing the reconstruction of the chrominance component of the image at the receiver;

FIGS. 10a,b, and c are diagrams useful in describing the display of the image at the receiver;

FIGS. 11-15 are flow charts useful in describing the operation of the transceiver shown in FIG. 4 according to the present invention.

MODES OF CARRYING OUT THE INVENTION

Figure 1:
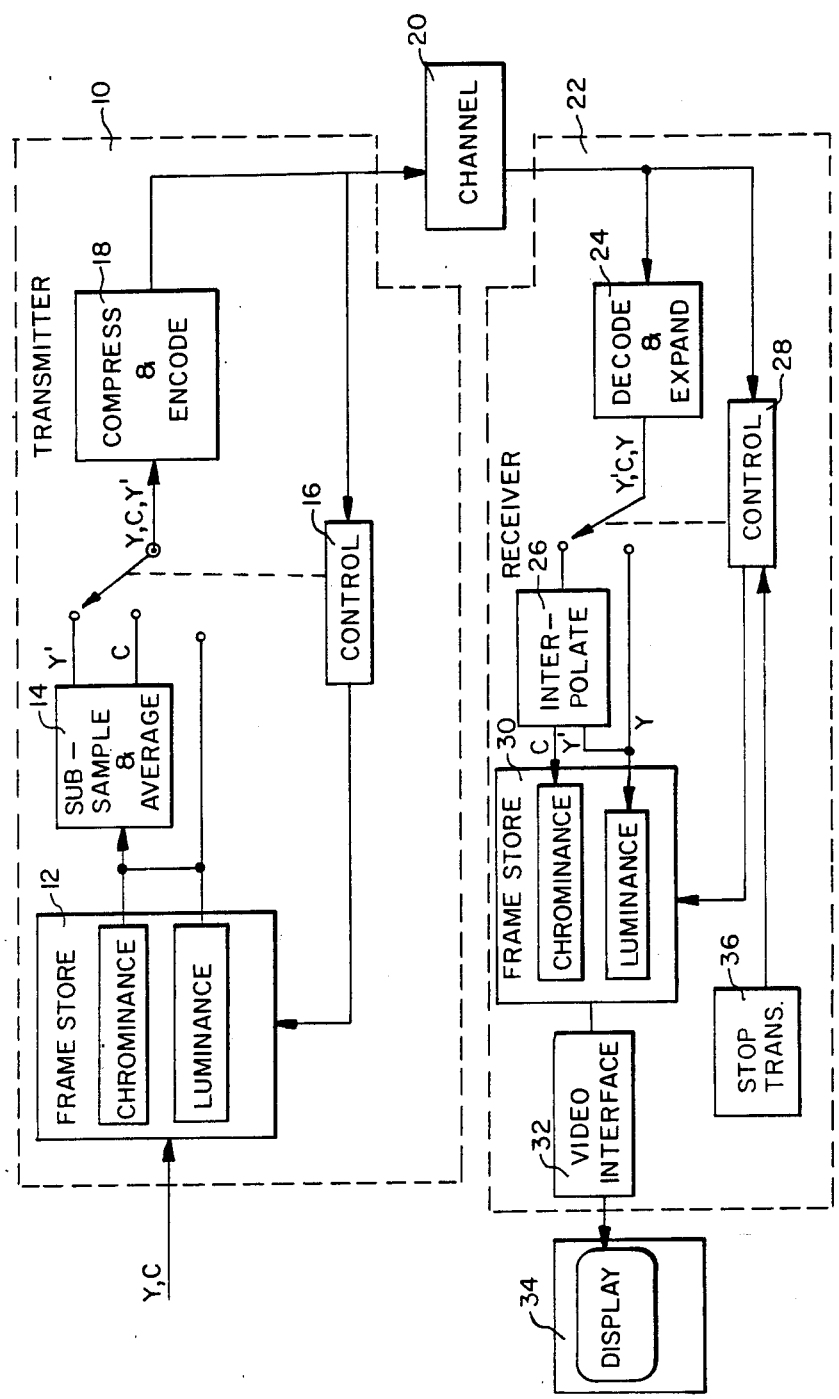
FIG. 1 is a block diagram of a still image communication system according to the present invention.

FIG. 1 is a block diagram showing the major elements of a communication system for compressing and transmitting a digital color image signal according to the present invention. A transmitter 10 includes a frame store 12 for storing a luminance component Y and a chrominance component C of a digital color image. The transmitter receives a digital color image Y,C from a source such as a color video camera or a digital image recorder (not shown). The transmitter 10 subsamples and averages (14) the luminance component Y of the image to produce a preview luminance component Y', and subsamples and averages the chrominance component C. Control means 16 is provided for sequentially supplying the preview luminance component Y', the chrominance component C, and the full resolution luminance component Y to compression and encoding means 18. The preview luminance component of the image is compressed and encoded using a block discrete cosine transform (DCT), with Huffman and run-length encoding of the transformed coefficients. The compressed and encoded transform coefficients are transmitted over a narrow band communication channel such as a telephone line 20. Since discrete cosine transformation (DCT), and Huffman and run-length coding are well known in the art (see the above referenced U.S. Pat. No. 4,302,775) the details of this process will not be discussed further herein.

The compressed preview luminance component Y' of the image is received by a receiver 22 and decoded and expanded (24). Control means 28 supplies the decoded and expanded preview luminance component Y' to an interpolation means 26. The interpolated preview luminance signal Y' is stored in a luminance component storage area of a frame store 30. A video interface 32 retrieves the preview luminance component from the frame store, and generates a preview video signal from the digital preview luminance component stored in the frame store 30. The preview video signal is displayed on a display monitor 34.

After the preview luminance component has been transmitted and received, the transmitter 10 subsamples a chrominance component of the color digital image, compresses and transmits it. The receiver 22 receives, decodes, and displays the chrominance component of the digital image by adding the chrominance component block-by-block to the preview luminance component on a display 34. When the transmission and receipt of the chrominance component is complete, the transmitter 10 compresses and transmits the full resolution luminance component Y of the digital color image. The receiver 22 receives the full resolution luminance component Y and replaces the preview luminance component on the display 24 block-by-block as the full resolution luminance component is received and decoded. If at any time during the receipt of the digital color image, a viewer at receiver 22 determines that further transmission of the image is not required, the viewer can signal the transmitter by a stop transmission button 36 on the receiver 22 which causes a signal to be sent to the transmitter 10 to terminate transmission, thereby saving the time required to complete transmission of the image.

Figure 2:
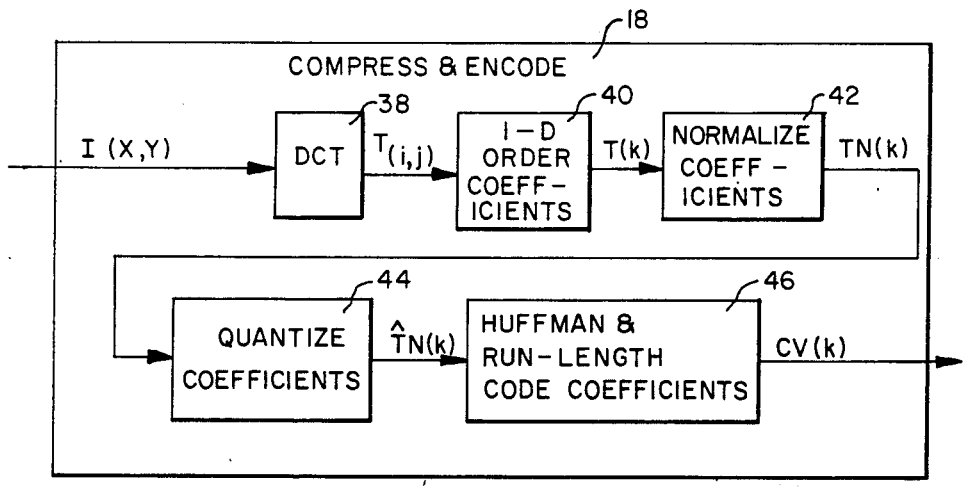
FIG. 2 is a block diagram showing further details of the compress and encode block of FIG. 1.

Referring to FIG. 2, the means in the transmitter for compressing and encoding the digital image is shown in more detail. The compress and encode means include means 38 for performing a discrete cosine transform (DCT) on a block (e.g. 16×16 pixels) I(x,y) of digital image values to produce a block of transformed coefficients T(i,j). The transformed coefficients T(i,j) are ordered (40) into a one dimensional array T(k) in order of increasing spatial frequency, for example by employing a zig-zag scan of the block transform coefficients along diagonals starting with the coefficient representing zero frequency in the horizontal and vertical directions. The one dimensional array of transform coefficients T(k) is normalized (42) to produce an array of normalized coefficients TN(k), and quantized (44) to produce an array of quantized "normalized coefficients" T̂N(k). The quantized normalized coefficients T̂N(k) are then Huffman and run-length encoded (46) to produce a coded block image signal CV(k).

Figure 3:
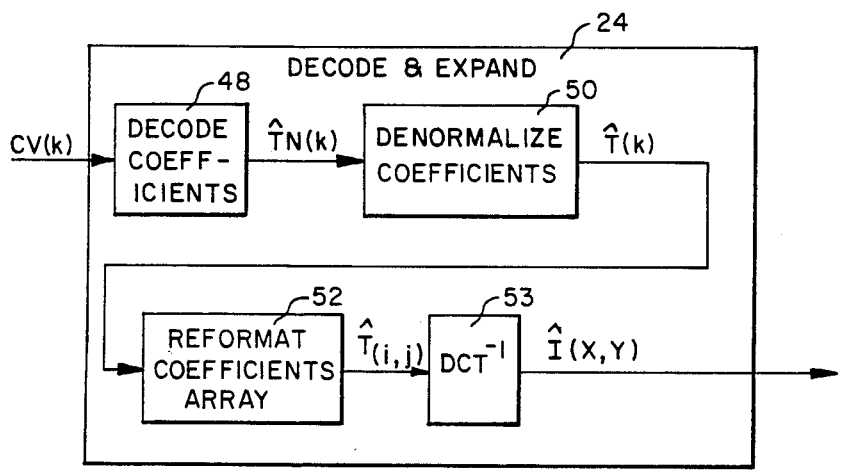
FIG. 3 is a block diagram showing further details of the decode and expand block of FIG. 1.

The means 24 for decoding and expanding the coded block image signal at the receiver 22 will now be described with reference to FIG. 3. The coded block image signal CV(k) is decoded (48) to produce decoded coefficients signals T̂N(K). The decoded signals are denormalized (50) to produce denormalized coefficient signals T̂(k). The denormalized coefficient values T̂(k) are reformatted (52) into a block T̂(i,j) and the block of coefficient values is inversely discrete cosine transformed (DCT$^{-1}$) (53) to produce the block of image values Î(x,y).

Presently preferred apparatus for implementing the signal processing steps outlined above is shown in FIG. 4. The digital image transmission system shown in FIG. 4 includes two or more transceivers 68 coupled to a telephone transmission line 70. Each of the transceivers 68 is connected to a video signal source such as a video camera 72, and to a video display such as a video monitor 74. Each transceiver 68 contains a standard video interface 76 that receives video signals from the video source, digitizes the signals, and supplies the digital image signals to a digital frame store 78. The video interface 76 also receives digital image signals from digital frame store 78 and produces a standard video signal for display on the video monitor 74. Each transceiver 68 is controlled by an Intel 80186 microprocessor 80 having conventional ROM 82 and RAM 84 for storing the control programs and temporary storage of data respectively. The microprocessor 80 performs the subsampling and averaging of the luminance component of the digital color image, and subsampling of the chrominance component, and the Huffman and run-length coding and decoding and the normalization and denormalization of the DCT coefficients. The coded DCT coefficients are sent and received over a telephone line 70 via an R96 FT/SC modem 86. The discrete cosine transform (DCT) (in the transmitting mode) and the reverse transform (in the receiving mode) are performed by a TMS 32020 Digital Signal Processor 88 having a conventional RAM 90 for storing the DCT transform program.

In the transmitting mode, the microprocessor 80 retrieves one 16×16 block of digital image values at a time from an image buffer 92 in the digital frame store 78. The image buffer 92 includes locations for storing the luminance and chrominance components of the image. In the case of the preview image, the 16×16 block of digital image data is subsampled and averaged from a 64×64 block of image values as will be described below. The 16×16 blocks of digital image values are temporarily stored in a dual port SRAM 94, that is accessible by both the microprocessor 80 and the digital signal processor 88. The digital image signal processor 88 performs the discrete cosine transform and returns the 16×16 block of transform coefficients to the dual port SRAM 94. The block of transform coefficients are then normalized and compressed (Huffman and run-length encoded) by the microprocessor 80. The compressed signal is stored in a compressed image buffer 96 in digital frame store 78. The compressed signal is transmitted over the telephone line 70 via modem 86 block-by-block as it is compressed. This cycle is repeated on each block until the entire image has been compressed and transmitted.

In the receiving mode, a compressed digital image is received via modem 86 and stored in compressed image buffer 96. One block at a time of compressed DCT coefficients are retrieved from the compressed image buffer 96, denormalized, and expanded by microprocessor 80. The expanded block of DCT coefficients is supplied to dual port SRAM 94. The digital signal processor 88 inversely transforms the coefficients to produce a 16×16 block of digital image values, which are temporarily stored in SRAM 94. Microprocessor 80 transfers the block of digital image values from the dual port SRAM 94 to image buffer 86. The contents of image buffer 92 are displayed on the video monitor 74 via video interface 76. As the image buffer 92 is filled with blocks of the image, the display on video monitor 74 is progressively filled with the image. User controls 96 are connected to microprocessor 80 to provide operator control of the transceiver 68.

Generation of the preview luminance component of the image by subsampling and averaging the full luminance component will now be described with reference to FIGS. 5 and 6. The full luminance component of the image is stored in the image buffer as two fields (field 1 and field 2) of 256 lines, 512 values per line, of luminance values Y(i,j). FIG. 5 shows one field of luminance values. The luminance values from this one field are subsampled by selecting every fourth value from each line, and the selected values are averaged in the vertical direction, two lines at a time, to produce a 128×128 array of preview luminance values. FIG. 6 illustrates the subsampling and averaging employed to generate the preview luminance component of the image. As noted above, the preview luminance component is processed and transmitted in 16×16 blocks of values.

Figure 7:
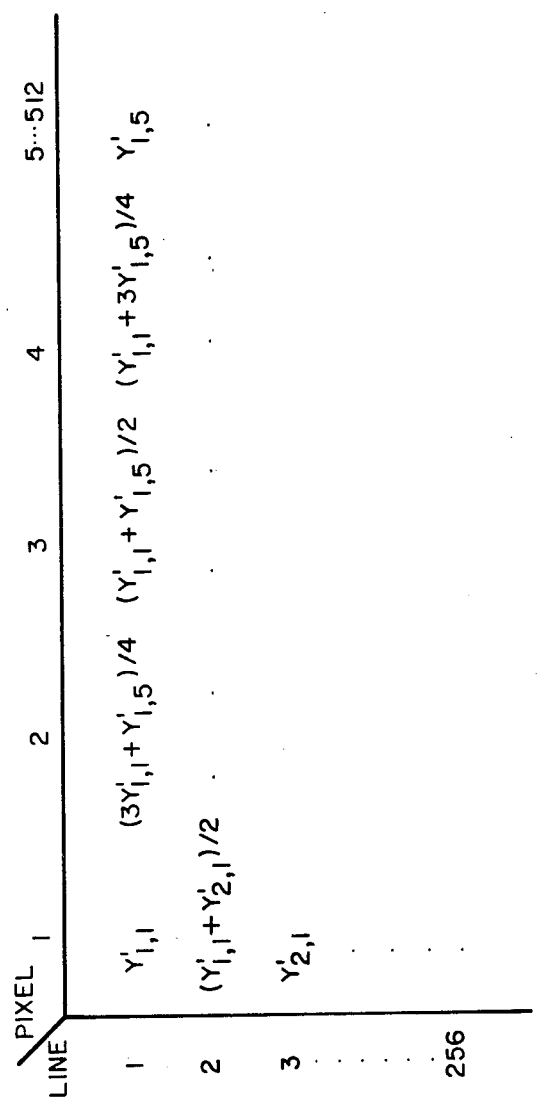
FIG. 7 is a diagram useful in describing the reconstruction of the luminance component from the preview luminance component for display.

Upon receipt and decoding, the preview luminance image is expanded to two fields of 256 lines by 512 values as follows. The 128 luminance values in each line are linearly interpolated in the horizontal direction to provide 512 values per line. Next the 128 lines of 512 values each are linearly interpolated in the vertical direction to provide 256 lines. FIG. 7 illustrates the interpolation process. The resulting field of 256 lines of 512 values each is duplicated to provide two fields (field 1 and field 2) in the image buffer at the receiver. This process is performed on a block-by-block basis. The chrominance component of the digital color image is stored in the image buffer as 512 lines by 128 red minus luminance (R−Y) values and 512 lines by 128 blue minus luminance (B−Y) values. FIG. 8a shows the arrangement of the red chrominance component in the memory, where R is used for R−Y for simplicity. The blue component is similar. These values are subsampled to 256 lines by using the values from only one field. The values from the one field are further reduced by averaging two lines at a time to produce a 128 by 128 array of R−Y chrominance values. FIG. 8b shows the subsampled array of 128 by 128 red chrominance component values. The blue chrominance component is handled in a similar manner. Taking these averaged values in 16×16 blocks, produces 64 R−Y chrominance component blocks and 64 B−Y chrominance component blocks to be processed. The chrominance components are processed and transmitted one block at a time, alternating between blocks of red and blue values until the entire chrominance component of the image has been compressed and transmitted.

Upon receipt and decoding, the blocks of chrominance component transform coefficients are inversely transformed, and expanded in the vertical direction by simple linear interpolation. FIG. 9 shows the expansion of the red chrominance component, wherein the decoded red chrominance component is indicated by R'(i,j). The blue chrominance component is expanded in a similar manner.

Figure 10B:
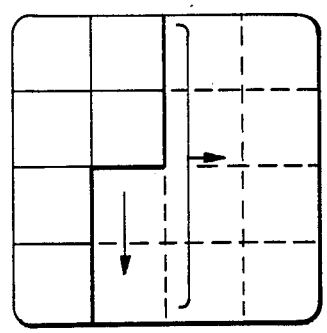
Figure 10C:
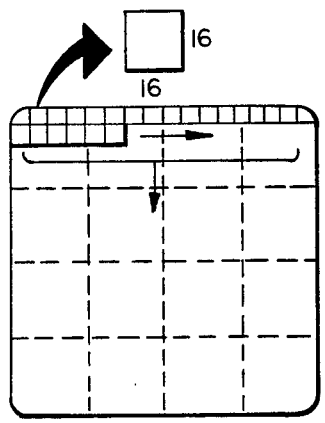

FIGS. 10a-c show how the display appears at the receiver as components of the image are received and displayed. Referring first to FIG. 10a, 64×64 pixel blocks of the preview luminance component are progressively added to the display. The blocks are added to the display one column at a time starting from the upper left hand corner of the screen progressing down the columns, with the columns progressing to the right to fill the screen. FIG. 10b shows how the chrominance components of the image are added to the preview luminance component 1 block at a time, starting in the upper left hand corner progressively filling one column at a time, and proceeding to the right as each column is filled. FIG. 10c illustrates how the preview luminance component is replaced by the full resolution luminance component one 16×16 block of pixels at a time. The replacement proceeds one line at a time starting at the upper left corner of the screen proceeding to the right and down the screen as each line is replaced.

In the preferred mode of practicing the invention, the transmitter can be operated in a preview mode, wherein only the preview luminance and the chrominance components of the image are compressed and transmitted, or in a full resolution mode, wherein the full resolution luminance component is compressed and transmitted after the preview luminance component and chrominance component have been transmitted. The mode of transmission is controlled by a mode switch (not shown) on the user control 96 shown in FIG. 4.

Figure 11:
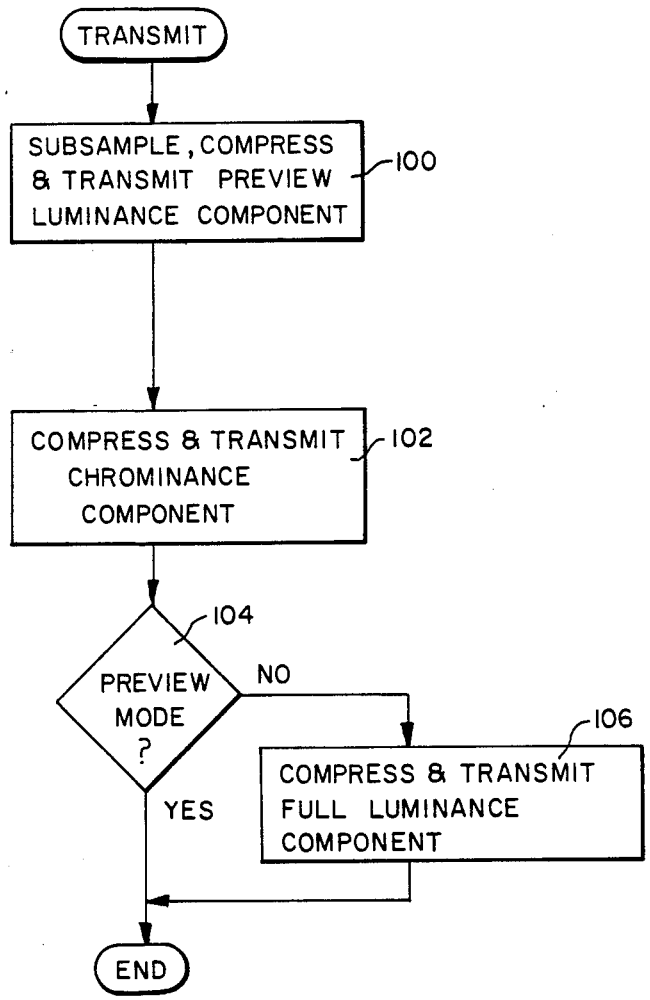

The following description will enable one skilled in the art to program the microprocessor 80 (see FIG. 4) to control the transceiver in the preview or full resolution modes of operation. FIG. 11 is a flow chart showing the major steps involved in transmitting the image. First the preview luminance image is subsampled, compressed, and transmitted (100) as described above. Next, the chrominance component of the image is compressed and transmitted (102) as described above. A check is made (104) to see if the transmission is in the preview mode. If the preview mode has been selected, the transmission is ended at this point. If not, the full luminance component is compressed and transmitted (106).

Figure 12:
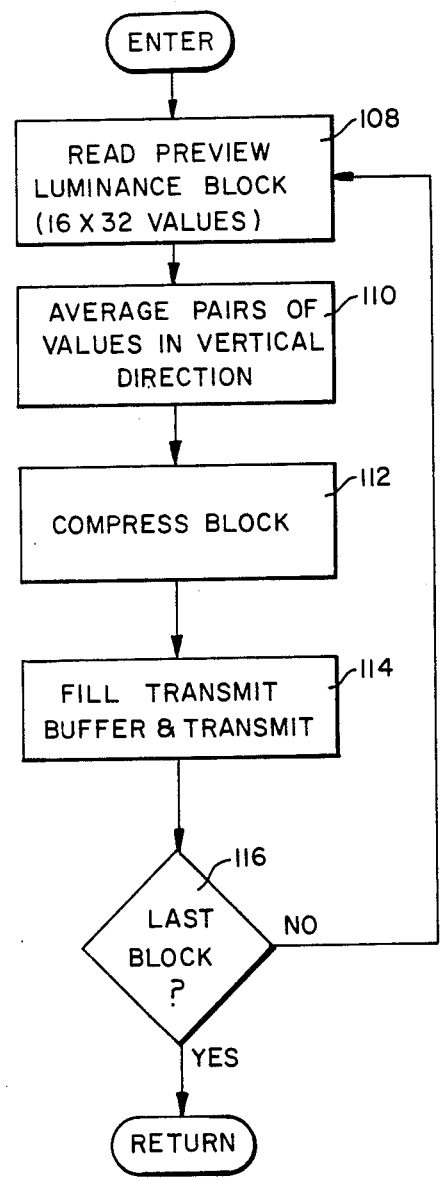

The steps of subsampling, compressing, and transmitting the preview luminance component of the digital image are shown in further detail in FIG. 12. A preview luminance block of 16 values in the horizontal direction (every fourth value along the lines of one field) by 32 values in the vertical direction is retrieved (108) from the luminance component stored in the image buffer. Next, the average is taken (110) of pairs of values in the vertical direction to produce a $16 \times 16$ array of preview luminance values (112). The $16 \times 16$ array of luminance values is compressed using a DCT with Huffman and run-length coding. The encoded transform coefficients are loaded into a transmit buffer, and when the transmit buffer is full its contents are transmitted (114). An index is checked to see if this is the last block in the image (116). If so, the routine is exited. If this is not the last block in the image, the process returns to the first step (108) and reads the next block of image values.

Figure 13:
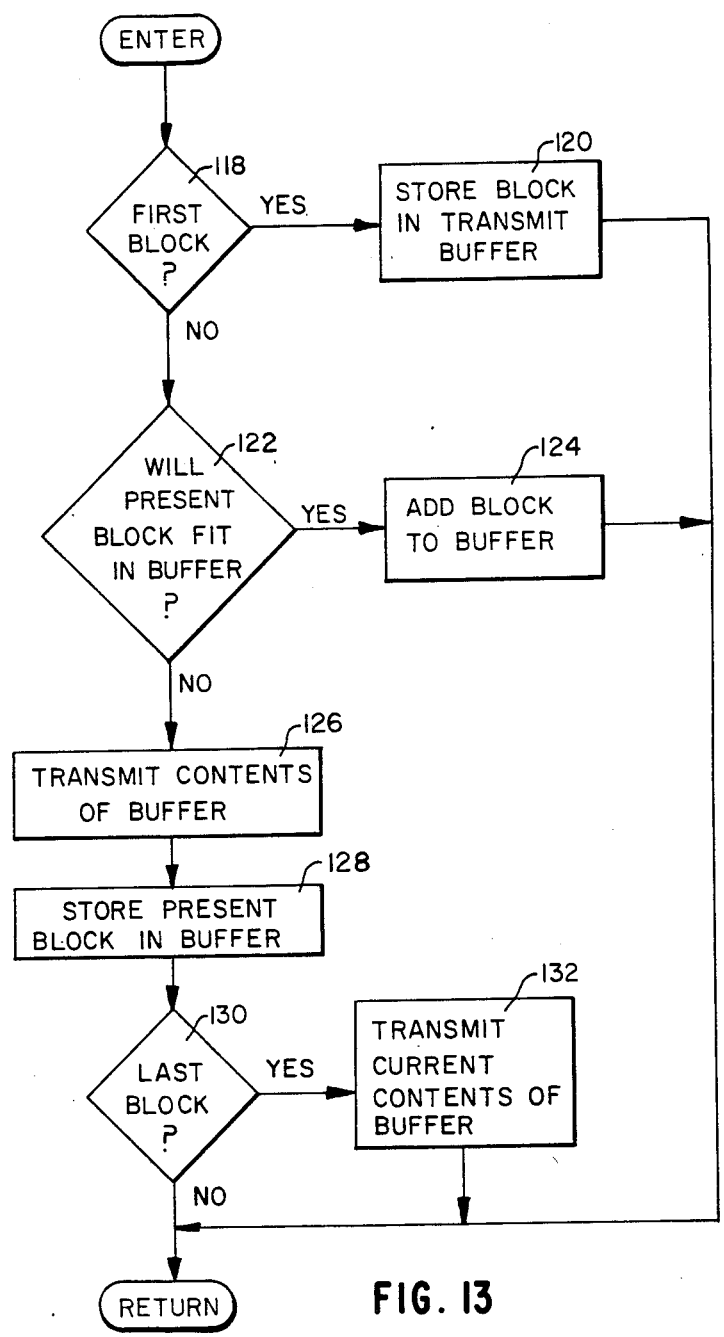

The step of filling transmit buffer and transmitting the compressed coefficients will now be described in further detail with reference to FIG. 13. First, a check is made to see if this is the first block of the image (118). If so, the compressed and coded transform coefficients from the first block are stored in the transmit buffer (120) and the procedure returns to the step (116) in FIG. 12. If this is not the first block of the image, a check is made to see if the present block of compressed transform coefficients will fit into the transmit buffer (122). If they will fit, the coded coefficients are added to the buffer (124), and the procedure returns. If the buffer would overflow, the present contents of the buffer are transmitted (126), and the coded coefficients are loaded into the buffer (128). Finally, a check is made to see if this is the last block of the image (130). If so, the current contents of the buffer are transmitted (132) and the procedure returns. If this is not the last block of the image, the procedure returns to step (116) of FIG. 12.

The process of receiving the image will now be described with reference to FIG. 14. The coded and compressed coefficients are received and stored in the compressed image buffer (134). As the coded image is being received, the preview luminance component of the image is expanded, block-by-block, stored in the image buffer, and displayed on the monitor (136). When the compressed chrominance component of the image is received, it is expanded block-by-block, stored in the image buffer, and added to the display (138). A check is made to determine if the image is preview only (140). If so, the receive procedure is ended. If not, the full luminance component of the image is expanded block-by-block, stored in the frame buffer, and displayed, replacing the preview luminance component of the image block-by-block (142).

Figures 14, 15:
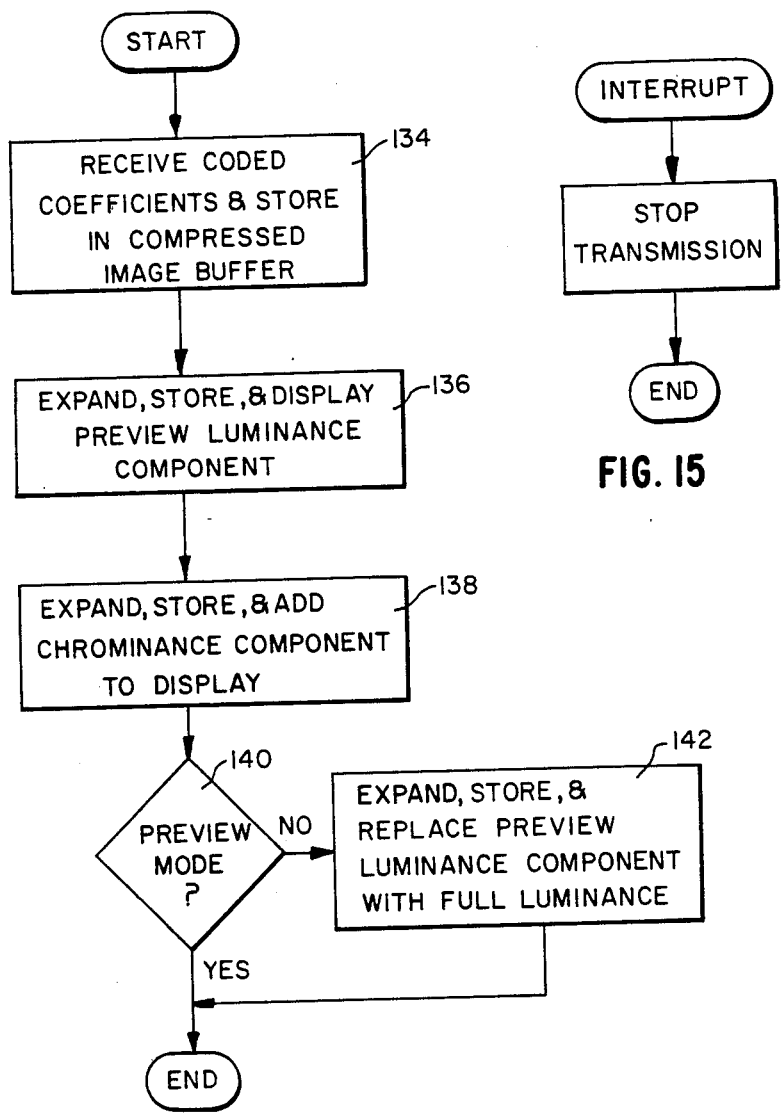

If at any time during the transmission the receiver signals the transmitter to stop transmitting, an interrupt to the microprocessor is activated causing the transmitter to stop transmission of the image, see FIG. 15.

Industrial Applicability and Advantages

The present invention is useful in communication systems for transmitting pictorial images over limited bandwidth communication channels such as telephone lines. The invention has the advantage of providing a preview image during the transmission of a full resolution image without the requirement for a substantial increase in the memory at the receiver.

We claim:

1. A still image communication system of the type having means at the transmitter for performing a block cosine transformation on an image for bandwidth compression, means at the receiver for displaying a low resolution preview image during transmission of a full resolution image, and means at the receiver for terminating transmission of the image, characterized by: means at the transmitter for subsampling a full resolution image to produce the low resolution preview image, and for compressing and transmitting the low resolution preview image, followed by the full resolution image; and means at the receiver for displaying the low resolution image, and replacing the low resolution image block-by-block with the full resolution image as the full resolution image is received.

2. The still image communication system claimed in claim 1, further characterized by:

control means at the transmitter for selectively operating the transmitter in a preview mode where only the preview image is transmitted.

3. The still image communication system claimed in claim 2, wherein the image is a color image having a full resolution luminance component and a chrominance component, and further characterized by:

a. the means at the transmitter for subsampling, compressing, and transmitting the image, subsamples the luminance component to produce a low resolution preview luminance component, and compresses and transmits, in order, the low resolution preview luminance component, the chrominance component, and the full resolution luminance component; and b. the means at the receiver displays the low resolution preview luminance component, adds the chrominance component block-by-block to the low resolution luminance component, and replaces block-by-block the low resolution luminance component with the full resolution luminance component.

4. The color still image communication system claimed in claim 3, wherein the full resolution luminance component of the image is a $512 \times 512$ array of luminance (Y) values, the chrominance component is a $128 \times 128$ array of red minus luminance (R−Y) values and a $128 \times 128$ array of blue minus luminance (B−Y) values, and the low resolution preview luminance component is a $128 \times 128$ array of luminance values.

5. A communication system for communicating a full resolution digital image over a limited bandwidth communication channel, comprising:

a. means for compressing and transmitting a digital image, including;

(1) means for subsampling said full resolution digital image to produce a low resolution preview image, (2) means for compressing said preview image or said full resolution by block cosine transformation and Huffman and run-length coding of transform coefficients, (3) means for transmitting a compressed image block-by-block, and (4) transmitter control means operative in a preview mode for affecting compression and transmission of said preview image and operative in a full resolution mode for effecting compression and transmission of said preview image followed by said full resolution image, and responsive to a terminate transmission signal for terminating transmission of an image, and b. receiver means for receiving, expanding, and displaying a digital image including;

(1) means for receiving a compressed image, block-by-block, (2) means for expanding a received image block-by-block, (3) means for displaying an expanded image block-by-block, (4) control means for affecting display of a preview image, and for replacing said preview image on said display means with a full resolution image block-by-block, as said full resolution image is received, and (5) means responsive to an operator input for generating and transmitting a terminate transmission signal.

6. The communication system claimed in claim 5 wherein said full resolution digital image is a color digital image having a full resolution luminance component, and a chrominance component; said means for subsampling said image, subsamples said full resolution luminance component to produce a low resolution preview luminance component; said means for compressing, compresses said luminance component, and said chrominance component; said transmitter control means operates in said preview mode to compress and transmit a preview luminance component and said chrominance sequentially; and said control means operates in said full resolution mode to compress and transmit said preview luminance component, said chrominance component, and said full resolution luminance component sequentially; and said receiver control means effects display of said low resolution preview luminance component, adds said chrominance component block-by-block to said preview luminance component to produce a low resolution color preview image, and replaces said low resolution preview-luminance component block-by-block with said full resolution luminance component.

7. The communication system claimed in claim 6 wherein said full resolution luminance component is a 512×512 array of luminance (Y) values, said chrominance component is 128×128 array or red minus luminance (R−Y) values and 128×128 array of blue minus luminance (B−Y) values and said means for subsampling said image subsamples saaid array of luminance component values to an array of 128×128 luminance values.

* * * * *